US007557077B2

(12) United States Patent
Harrison

(10) Patent No.: US 7,557,077 B2

(45) Date of Patent: Jul. 7, 2009

(54) USE OF NONIONIC POLYSACCHARIDE IN A COMPOSITION FOR CARING FOR ARTICLES MADE OF TEXTILE FIBERS

(75) Inventor: Ian Harrison, Poissy (FR)

(73) Assignee: Rhodia Chimie, Billancourt Cedex (FR)

( * ) Notice: Subject to any disclaimer, the term of this patent is extended or adjusted under 35 U.S.C. 154(b) by 299 days.

(21) Appl. No.: 11/386,931

(22) Filed: Mar. 22, 2006

(65) Prior Publication Data

US 2006/0162092 A1 Jul. 27, 2006

Related U.S. Application Data

(62) Division of application No. 10/470,674, filed on Jul. 29, 2003, now abandoned.

(51) Int. Cl.
*C11D 3/22* (2006.01)
*C08B 11/00* (2006.01)
*C08B 37/00* (2006.01)

(52) U.S. Cl. ....................... 510/356; 510/327; 510/328; 510/337; 510/470; 510/471; 510/473; 510/474; 510/276; 510/296; 8/137; 536/114; 536/120; 536/123; 536/123.1

(58) Field of Classification Search ................. 510/356, 510/327, 328, 337, 470, 471, 473, 474, 276, 510/296; 8/137; 536/114, 120, 123, 123.1
See application file for complete search history.

(56) References Cited

U.S. PATENT DOCUMENTS

| | | | | |
|---|---|---|---|---|
| 3,326,890 A | 6/1967 | Engelskirchen et al. | | |
| 4,169,945 A | 10/1979 | Deguia | 536/114 |
| 5,489,674 A | 2/1996 | Yeh | |
| 5,552,462 A | 9/1996 | Yeh | 524/55 |
| 5,756,720 A | 5/1998 | Chowdhary | 536/124 |
| 5,801,116 A | 9/1998 | Cottrell et al. | 502/404 |
| 5,851,625 A | 12/1998 | Smesny et al. | 428/95 |
| 5,919,271 A * | 7/1999 | Baillely et al. | 8/137 |
| 5,948,744 A * | 9/1999 | Baillely et al. | 510/299 |
| 6,228,827 B1 * | 5/2001 | Penninger et al. | 510/320 |
| 6,387,871 B2 * | 5/2002 | Faber | 510/470 |
| 6,395,690 B1 * | 5/2002 | Tsaur | 510/130 |
| 6,485,945 B1 | 11/2002 | Potter et al. | 435/101 |
| 6,897,188 B2 * | 5/2005 | Gohl et al. | 510/276 |
| 6,897,189 B2 * | 5/2005 | Dupont et al. | 510/287 |
| 7,074,919 B2 * | 7/2006 | Aubay et al. | 536/114 |
| 2003/0050218 A1 * | 3/2003 | Geffroy et al. | 510/475 |
| 2007/0191254 A1 * | 8/2007 | Harrison et al. | 510/470 |
| 2008/0263788 A1 * | 10/2008 | Harrison et al. | 8/442 |

FOREIGN PATENT DOCUMENTS

| | | |
|---|---|---|
| EP | 0 290 740 | 11/1988 |
| JP | 03131695 | 6/1991 |
| JP | 11335698 A * | 12/1999 |
| WO | WO 00/34382 | 6/2000 |

OTHER PUBLICATIONS

English translation of JP 3131695, Jun. 5, 1991.*
Database WPI Week 0800—Derwent Publications Ltd. London, GB; AN 2000-092801, XP002178525 "Production of Liquid Detergent composition—includes preparing aqueous phase by dissolving water solble polymer in aqueous component" & JP 11 335698 A (Lion Corp), Dec. 7, 1999 abstract.
Database WPI Week 199129—Derwent Publications Ltd. London, GB; AN 1991-210749, XP002203027 "Detergent additive preventing re-soiling of cloths by oil . . . " & JP 03131695 A (Sanyo Chem Ind Ltd), Jun. 5, 1991 abstrat.
International Search Report.

* cited by examiner

*Primary Examiner*—Douglas Mc Ginty
(74) *Attorney, Agent, or Firm*—Hunton & Williams LLP

(57) ABSTRACT

The invention concerns the use, in a composition for textile care in aqueous or wet medium, of a non-ionic polysaccharide whereof the native skeleton is formed of a main chain comprising similar or different anhydrohexose units, and branches including at least an anhydropentose and/or anhydrohexose unit. The anhydrohexose and/or anhydropentose units of the native skeleton being modified by at least a non-ionic group. The composition is designed for washing and/or rinsing and/or softening, prespotting textile articles, drying wet clothes in a dryer or for facilitating ironing.

25 Claims, No Drawings

USE OF NONIONIC POLYSACCHARIDE IN A COMPOSITION FOR CARING FOR ARTICLES MADE OF TEXTILE FIBERS

This application is a division of U.S. application Ser. No. 10/470,674, filed on Jul. 29, 2003 now abandoned.

The present invention relates to the use, in a composition for caring for articles made of textile fibers (textile care) and especially cotton-based articles, in particular colored articles, of at least one nonionic polysaccharide as an agent for preventing the degradation of these articles, for protecting the colors of said articles and/or for affording said articles crease-resistance and/or softening properties.

It is advantageous, especially during washing or rinsing operations, to protect articles made of textile fibers, in particular fabrics, against physical or chemical degradation phenomena (especially to protect the colors of colored articles) and/or to provide benefits thereto, for instance softening and/or crease-resistance properties.

The machine washing of fabrics leads to a physical and chemical degradation of the fibers and most particularly of cotton fibers. The alkalinity delivered by detergents and also by certain specific compounds such as oxidizing substances (perborate or percarbonate) or certain enzymes may be the cause of the chemical degradation of cotton fibers. However, it is generally the combination of the chemical and mechanical actions which leads to degradation of the fibers. The mechanical action is produced during the washing, rinsing, spin-drying or tumble-drying, when the latter takes place in a tumble dryer. This degradation of the fibers leads to the formation of fibrils at the surface of the textile which end up causing colored textiles to lose their radiance. This degradation also induces a decrease in the strength of the textile which, at the extreme, may lead to tearing of the fabrics. This degradation of the textiles may be evaluated quantitatively either by a loss of the colors of colored textiles or by a reduction in the tear strength of the textile. It is generally necessary to carry out 10 to 20 cumulative machine washes in order to perceive this type of degradation.

Cleaning in a washing machine, which systematically includes a spin-drying operation, also leads to creased fabrics, which is accentuated during the tumble-drying stage, in particular by the formation of inter-fiber hydrogen bonds. It is thus necessary to iron the fabrics in order to make them look presentable.

In order to reduce the degradation of the fibers during washing or rinsing, the suppliers of chemical products or detergents have made use of changes in detergent formulations or have used certain specific additives.

Mention may be made in particular of detergents comprising no oxidizing system, but which have reduced cleaning capacities.

Silicone-based compounds have also been used, and in particular aminosilicones (U.S. Pat. No. 4,585,563; WO 92/07927; WO 98/39401).

The use of hydroxypropyl guar as thickener in liquid detergent compositions for textiles is known (JP 11 335 698 A).

The Applicant has found that the use, in compositions for treating articles made of textile fibers, especially cotton-based articles, which are in particular colored, of certain nonionic, hydrophobic substituent-carrying polysaccharides that are soluble under the working conditions in aqueous or wet medium of said compositions, makes it possible to prevent the degradation of these articles, makes it possible to protect the colors and/or gives these articles crease-resistance and/or softening properties.

Such compositions may especially be compositions for washing and/or rinsing and/or softening articles made of textile fibers, for destaining articles made of textile fibers before washing ("prespotting"), for tumble-drying articles made of textile fibers in a tumble dryer or for making ironing of articles made of textile fibers easier.

A first subject of the invention consists of the use, in a composition for caring for articles made of textile fibers in aqueous or wet medium, of at least one nonionic polysaccharide that is soluble under the working conditions of said composition, a polysaccharide the native skeleton of which is formed from

- a main chain comprising identical or different anhydrohexose units, and
- branches comprising at least one anhydropentose and/or anhydrohexose unit, the anhydrohexose and/or anhydropentose units of the native skeleton being modified with at least one nonionic group, the degree of modification MS of the anhydrohexose and/or anhydropentose units with said nonionic group or groups being of at least 0.001 and preferably of at least 0.01, as an agent for preventing the degradation of said articles and/or for protecting the colors of said articles and/or for affording said articles crease-resistance and/or softening properties.

The viscosity of an aqueous solution containing 1% by weight of said nonionic polysaccharides, measured at 25° C. using a Brookfield viscometer at 20 rpm, can preferably range from 200 to 5 000 mPa·s.

The degree of modification MS is expressed as the average number of moles of precursor of the nonionic modifying group that have reacted per anhydrohexose and/or anhydropentose unit.

The degree of modification MS may vary according to the nature of the precursor of said modifying group.

If said precursor is incapable of forming new reactive hydroxyl groups (for example alkylation precursor), the degree of modification with the nonionic groups is less than 3, by definition.

If said precursor is capable of forming new reactive hydroxyl groups (for example hydroxyalkylation precursor), the degree of modification MS is theoretically unlimited; it may be, for example, up to 6 and preferably up to 2.

Said nonionic groups are linked to the carbon atoms of the sugar skeleton either directly or via —O— bonds.

Among the nonionic groups that may be mentioned are those of formula:

•$-[-CH_2-CH(R)-O]_x-R^1$ in which:

R is a hydrogen atom or an alkyl radical containing from 1 to 4 carbon atoms, x is an integer ranging from 0 to 6, $R^1$ represents:

- a hydrogen atom when x is different from 0
- an alkyl radical containing from 1 to 22 carbon atoms, optionally interrupted with one or more oxygen and/or nitrogen hetero atoms, cycloalkyl, aryl or arylalkyl, containing from 6 to 12 carbon atoms,
- a radical $-(CH_2)_y-COOR^2$
- a radical $-(CH_2)_y-CN$
- a radical $-(CH_2)_y-CONHR^2$ $R^2$ representing an alkyl, aryl or arylalkyl radical containing from 1 to 22 carbon atoms, and y is an integer ranging from 0 to 5

•$-CO-NH-R^1$ linked to a carbon atom of the sugar skeleton via an —O— bond, with $R^1$ having the definition given above.

Mention may be made most particularly of the following groups:

methyl, ethyl, propyl, isopropyl, butyl, hexyl, octyl, dodecyl, octadecyl, phenyl, benzyl, linked to a carbon atom of the sugar skeleton via an ether, ester, amide or urethane bond, cyanoethyl, hydroxyethyl, hydroxypropyl, hydroxybutyl, linked to a carbon atom of the sugar skeleton via an —O— bond.

The hexose units (identical or different) of the main chain of the native skeleton may be D-glucose, D-or L-galactose, D-mannose, D-or L-fucose, L-rhamnose, etc. units.

The pentose and/or hexose units (identical or different) of the branches of the native skeleton may be D-xylose, L-or D-arabinose, D-glucose, D-or L-galactose, D-mannose, D-or L-fucose, L-rhamnose, etc. units.

Examples of native skeletons that may be mentioned include galactomannans, galactoglucomannans, xyloglucans, scleroglucans, etc.

The native skeleton is preferably a galactomannan. Galactomannans are macromolecules comprising a main chain of D-mannopyranose units linked in position $\beta(1\text{-}4)$ substituted with D-galactopyranose units in position $\alpha(1\text{-}6)$. Among these, mention may be made of guar gum, carob gum and tara gum.

The native skeleton is most preferably a guar gum. Guar gums have a mannose/galactose ratio of 2.

The nonionic polysaccharides according to the invention may be obtained in a manner that is known per se.

Most of them are commercial products.

Examples of nonionic polysaccharides according to the invention that may be mentioned most particularly include hydroxypropyl galactomannans, in particular hydroxypropyl guars.

For good implementation of the invention, these polysaccharides may have a degree of modification of about from 0.1 to 6, preferably from 0.1 to 1.6 and most preferably from 0.4 to 1.2.

A second subject of the invention consists of a process for improving the properties of a composition for caring for articles made of textile fibers in aqueous or wet medium, by adding to said composition an effective amount of at least one nonionic polysaccharide according to the invention for preventing the degradation of said articles and for protecting the colors of said articles and/or for affording said articles crease-resistance and/or softening properties.

A third subject of the invention consists of a process for preventing the degradation of articles made of textile fibers and for protecting the colors of said articles and/or for affording said articles crease-resistance and/or softening properties, by treating said articles, in aqueous or wet medium, with a composition comprising at least one nonionic polysaccharide according to the invention.

The composition and the working (or treatment) conditions may be in numerous forms.

Said composition may be in the form of a solid (powder, granules, tablets, etc.) or of a dispersion or of a concentrated aqueous solution placed in contact with the articles to be treated, after dilution in water;

in the form of a dispersion or of a concentrated aqueous solution placed beforehand on the dry articles to be treated before dilution in water;

in the form of a dispersion or of an aqueous solution to be placed directly on the dry articles to be treated without dilution or of a solid support (stick) comprising said nonionic polysaccharide, to be applied directly to the dry articles to be treated;

in the form of an insoluble solid support comprising said nonionic polysaccharide placed directly in contact with the wet articles to be treated.

Thus, the composition of the invention may be:

a solid or liquid detergent formulation capable of directly forming a washing bath by dilution;

a liquid rinsing and/or softening formulation capable of directly forming a rinsing and/or softening bath by dilution;

a solid material, in particular a textile, comprising said nonionic polysaccharide, which is intended to be placed in contact with wet fabrics in a tumble dryer (said solid material is referred to hereinbelow as a "tumble dryer additive");

an aqueous ironing formulation;

a washing additive ("prespotter") intended to be placed on the dry fabrics prior to a washing operation using a detergent formulation containing or not containing said nonionic polysaccharide (said additive is referred to hereinbelow as a "prespotter").

The composition of the invention is particularly suitable for caring for articles (fabrics) and especially cotton-based articles, in particular articles containing at least 35% cotton. It is most particularly suitable for caring for colored articles.

The nonionic polysaccharides used according to the invention are soluble under the working conditions in aqueous or wet medium of said composition.

Said nonionic polysaccharides are considered as soluble when more than 50% and preferably more than 70% of their weight are soluble in the working aqueous or wet medium of the composition of the invention, i.e. especially under the temperature and pH conditions of said medium.

The working pH of the composition of the invention may range from about 2 to about 12, depending on the desired use.

When it is:

a detergent formulation, the pH of the washing bath is generally from about 7 to 11 and preferably from 8 to 10.5;

a rinsing and/or softening formulation, the pH of the rinsing and/or softening bath is generally from about 2 to 8;

a tumble dryer additive, the pH to be considered is that of the residual water, which may be from about 2 to 9;

an aqueous ironing formulation, the pH of said formulation is generally from about 5 to 9;

a prespotter, the pH to be considered is that of the washing bath for the operation following washing, i.e. from about 7 to 11 and preferably from 8 to 10.5.

The amount of nonionic polysaccharide present in the care composition according to the invention may range from 0.05% to 10% as dry weight relative to the dry weight of said composition, depending on the desired application.

Thus, said nonionic polysaccharide (NP) may be used as follows:

| % of (NP) (as dry weight) | in a care composition according to the invention used as |
|---|---|
| 0.05-5 preferably 0.1-3 | detergent formulation |
| 0.05-3 preferably 0.1-2 | rinsing and/or softening formulation |
| 0.05-10 | tumble dryer additive |

-continued

| % of (NP) (as dry weight) | in a care composition according to the invention used as |
|---|---|
| 0.05-10 preferably 0.1-5 | ironing formulation |
| 0.05-10 preferably 0.1-5 | prespotter |

Other constituents may be present, along with the nonionic polysaccharide, in the care composition according to the invention. Said composition may contain at least one surfactant and/or one detergent additive and/or rinsing additive and/or softening additive for articles made of textile fibers and/or one solid support (especially a textile support) for said nonionic polysaccharide.

The nature of these constituents depends on the desired use of said composition.

Thus, when it is a detergent formulation, for washing articles made of textile fibers, it generally comprises:

at least one natural and/or synthetic surfactant, at least one detergent adjuvant ("builder")

optionally an oxidizing agent or system, and a series of specific additives.

The detergent formulation may comprise surfactants in an amount corresponding to about 3% to 40% by weight relative to the detergent formulation, these surfactants being such as Anionic Surfactants alkyl ester sulfonates of formula R—CH($SO_3M$)—COOR', in which R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal (sodium, potassium or lithium) cation, a substituted or unsubstituted ammonium (methyl-, dimethyl-, trimethyl- or tetramethylammonium, dimethylpiperidinium, etc.) or an alkanolamine derivative (monoethanolamine, diethanolamine, triethanolamine, etc.). Mention may be made most particularly of methyl ester sulfonates in which the radical R is $C_{14}$-$C_{16}$;

alkyl sulfates of formula $ROSO_3M$, in which R represents a $C_5$-$C_{24}$ and preferably $C_{10}$-$C_{18}$ alkyl or hydroxyalkyl radical, M representing a hydrogen atom or a cation of the same definition as above, and also the ethoxylenated (EO) and/or propoxylenated (PO) derivatives thereof, containing on average from 0.5 to 30 and preferably from 0.5 to 10 EO and/or PO units;

alkylamide sulfates of formula RCONHR'$OSO_3M$ in which R represents a $C_2$-$C_{22}$ and preferably $C_6$-$C_{20}$ alkyl radical, R' represents a $C_2$-$C_3$ alkyl radical, M representing a hydrogen atom or a cation of the same definition as above, and also the ethoxylenated (EO) and/or propoxylenated (PO) derivatives thereof, containing on average from 0.5 to 60 EO and/or PO units;

saturated or unsaturated $C_8$-$C_{24}$ and preferably $C_{14}$-$C_{20}$ fatty acid salts, $C_9$-$C_{20}$ alkylbenzenesulfonates, primary or secondary $C_8$-$C_{22}$ alkylsulfonates, alkylglyceryl sulfonates, the sulfonated polycarboxylic acids described in GB-A-1 082 179, paraffin sulfonates, N-acyl N-alkyltaurates, alkyl phosphates, isethionates, alkyl succinamates, alkyl sulfosuccinates, sulfosuccinate monoesters or diesters, N-acyl sarcosinates, alkylglycoside sulfates, polyethoxycarboxylates; the cation being an alkali metal (sodium, potassium or lithium), a substituted or unsubstituted ammonium residue (methyl-, dimethyl-, trimethyl- or tetramethylammonium, dimethylpiperidinium, etc.) or an alkanolamine derivative (monoethanolamine, diethanolamine, triethanolamine, etc.);

Nonionic Surfactants polyoxyalkylenated (polyoxyethylenated, polyoxypropylenated or polyoxybutylenated) alkylphenols in which the alkyl substituent is $C_6$-$C_{12}$ and containing from 5 to 25 oxyalkylene units; examples which may be mentioned are the products Triton X-45, X-114, X-100 or X-102 sold by Rohm & Haas Co.;

glucosamide, glucamide or glycerolamide;

polyoxyalkylenated $C_8$-$C_{22}$ aliphatic alcohols containing from 1 to 25 oxyalkylene (oxyethylene or oxypropylene) units; examples which may be mentioned are the products Tergitol 15-S-9 and Tergitol 24-L-6 NMW sold by Union Carbide Corp., Neodol 45-9, Neodol 23-65, Neodol 45-7 and Neodol 45-4 sold by Shell Chemical Co., and Kyro EOB sold by The Procter & Gamble Co.;

products resulting from the condensation of ethylene oxide or the compound resulting from the condensation of propylene oxide with propylene glycol, such as the Pluronic products sold by BASF;

products resulting from the condensation of ethylene oxide or the compound resulting from the condensation of propylene oxide with ethylenediamine, such as the Tetronic products sold by BASF;

amine oxides such as $C_{10}$-$C_{18}$ alkyl dimethylamine oxides and $C_8$-$C_{22}$ alkoxy ethyl dihydroxyethylamine oxides;

the alkylpolyglycosides described in U.S. Pat. No. 4,565,647;

$C_8$-$C_{20}$ fatty acid amides;

ethoxylated fatty acids;

ethoxylated fatty amides;

ethoxylated amines.

Amphoteric and Zwitterionic Surfactants alkyldimethylbetaines, alkylamidopropyldimethylbetaines, alkyltrimethylsulfobetaines and the products of condensation of fatty acids and of protein hydrolysates;

alkyl amphoacetates or alkyl amphodiacetates in which the alkyl group contains from 6 to 20 carbon atoms.

The detergent adjuvants ("builders") for improving the surfactant properties may be used in amounts corresponding to about 5-50% and preferably to about 5-30% by weight for the liquid detergent formulations or to about 10-80% and preferably 15-50% by weight for the powder detergent formulations, these detergent adjuvants being such as:

Mineral Detergent Adjuvants polyphosphates (tripolyphosphates, pyrophosphates, orthophosphates or hexametaphosphates) of alkali metals, of ammonium or of alkanolamines tetraborates or borate precursors;

silicates, in particular those with an $SiO_2$/$Na_2O$ ratio from about 1.6/1 to 3.2/1 and the lamellar silicates described in U.S. Pat. No. 4,664,839;

alkali metal or alkaline-earth metal carbonates (bicarbonates, sesquicarbonates);

cogranulates of alkali metal silicate hydrates and of alkali metal (sodium or potassium) carbonates that are rich in silicon atoms in Q2 or Q3 form, described in EP-A-488 868;

crystalline or amorphous aluminosilicates of alkali metals (sodium or potassium) or of ammonium, such as zeolites A, P, X, etc.; zeolite A with a particle size of about 0.1-10 micrometers is preferred.

Organic Detergent Adjuvants

- water-soluble polyphosphonates (ethane 1-hydroxy-1,1-diphosphonates, methylenediphosphonate salts, etc.);
- water-soluble salts of carboxylic polymers or copolymers or water-soluble salts thereof, such as:
- polycarboxylate ethers (oxydisuccinic acid and its salts, monosuccinic acid tartrate and its salts, disuccinic acid tartrate and its salts);
- hydroxypolycarboxylate ethers;
- citric acid and its salts, mellitic acid and succinic acid and their salts;
- polyacetic acid salts (ethylenediaminetetraacetates, nitrilotriacetates, N-(2-hydroxyethyl)nitrilodiacetates);
- $C_5$-$C_{20}$ alkyl succinic acids and their salts (2-dodecenylsuccinates, lauryl succinates);
- carboxylic polyacetal esters;
- polyaspartic acid and polyglutamic acid and their salts;
- polyimides derived from the polycondensation of aspartic acid and/or of glutamic acid;
- polycarboxymethyl derivatives of glutamic acid or of other amino acids.

The detergent formulation may also comprise at least one oxygen-releasing bleaching agent comprising a percompound, preferably a persalt.

Said bleaching agent may be present in an amount corresponding to about 1% to 30% and preferably from 4% to 20% by weight relative to the detergent formulation.

As examples of percompounds which may be used as bleaching agents, mention should be made in particular of perborates such as sodium perborate monohydrate or tetrahydrate; peroxygenated compounds such as sodium carbonate peroxyhydrate, pyrophosphate peroxyhydrate, urea peroxyhydrate, sodium peroxide and sodium persulfate.

The preferred bleaching agents are sodium perborate monohydrate or tetrahydrate and/or sodium carbonate peroxyhydrate.

Said agents are generally combined with a bleaching activator which generates, in situ in the washing medium, a peroxycarboxylic acid in an amount corresponding to about 0.1% to 12% and preferably from 0.5% to 8% by weight relative to the detergent formulation. Among these activators, mention may be made of tetraacetylethylenediamine, tetraacetylmethylenediamine, tetraacetylglycoluryl, sodium p-acetoxybenzenesulfonate, pentaacetylglucose and octaacetyllactose.

Mention may also be made of non-oxygenated bleaching agents, which act by photoactivation in the presence of oxygen, these being agents such as sulfonated aluminum and/or zinc phthalocyanins.

The detergent formulation may also comprise oil-release agents, anti-redeposition agents, chelating agents, dispersants, fluorescers, foam suppressants, softeners, enzymes and various other additives.

Soil-Release Agents

These may be used in amounts of about 0.01-10%, preferably about 0.1-5% and more preferably about 0.2-3% by weight.

Mention may be made more particularly of agents such as:

- cellulose derivatives such as cellulose hydroxy ethers, methylcellulose, ethylcellulose, hydroxypropylmethylcellulose or hydroxybutylmethylcellulose;
- polyvinyl esters grafted onto polyalkylene trunks, such as polyvinyl acetates grafted onto polyoxyethylene trunks (EP-A-219 048);
- polyvinyl alcohols;
- polyester copolymers based on ethylene terephthalate and/or propylene terephthalate and polyoxyethylene terephthalate units, with an ethylene terephthalate and/or propylene terephthalate (number of units)/polyoxyethylene terephthalate (number of units) molar ratio from about 1/10 to 10/1 and preferably from about 1/1 to 9/1, the polyoxyethylene terephthalates containing polyoxyethylene units with a molecular weight from about 300 to 5 000 and preferably from about 600 to 5 000 (U.S. Pat. Nos. 3,959,230, 3,893,929, 4,116,896, 4,702,857, 4,770,666);
- sulfonated polyester oligomers obtained by sulfonation of an oligomer derived from ethoxylated allylic alcohol, from dimethyl terephthalate and from 1,2-propylene diol, containing from 1 to 4 sulfonated groups (U.S. Pat. No. 4,968,451);
- polyester copolymers based on propylene terephthalate and polyoxyethylene terephthalate units and ending with ethyl or methyl units (U.S. Pat. No. 4,711,730) or polyester oligomers ending with alkylpolyethoxy groups (U.S. Pat. No. 4,702,857) or sulfopolyethoxy (U.S. Pat. No. 4,721,580) or sulfoaroyl (U.S. Pat. No. 4,877,896) anionic groups;
- sulfonated polyester copolymers derived from terephthalic, isophthalic and sulfoisophthalic acid, anhydride or diester and from a diol (FR-A-2 720 399).

Anti-Redeposition Agents

These may be used in amounts generally of about 0.01-10% by weight for a powder detergent formulation of about 0.01-5% by weight for a liquid detergent formulation.

Mention may be made in particular of agents such as:

- ethoxylated monoamines or polyamines, and ethoxylated amine polymers (U.S. Pat. No. 4,597,898, EP-A-11 984);
- carboxymethylcellulose;
- sulfonated polyester oligomers obtained by condensation of isophthalic acid, dimethyl sulfosuccinate and diethylene glycol (FR-A-2 236 926);
- polyvinylpyrrolidones.

Chelating Agents

Agents for chelating iron and magnesium may be present in amounts of about 0.1-10% and preferably of about 0.1-3% by weight.

Mention may be made, inter alia, of:

- aminocarboxylates such as ethylenediaminetetraacetates, hydroxyethylethylenediaminetriacetates and nitrilotriacetates;
- aminophosphonates such as nitrilotris(methylenephosphonates);
- polyfunctional aromatic compounds such as dihydroxydisulfobenzenes.

Polymeric Dispersants

These may be present in an amount of about 0.1-7% by weight, to control the calcium and magnesium hardness, these being agents such as:

- water-soluble polycarboxylic acid salts with a molecular mass from about 2 000 to 100 000, obtained by polymerization or copolymerization of ethylenically unsaturated carboxylic acids such as acrylic acid, maleic acid or anhydride, fumaric acid, itaconic acid, aconitic acid, mesaconic acid, citraconic acid or methylenemalonic acid, and most particularly polyacrylates with a molecular mass from about 2 000 to 10 000 (U.S. Pat. No.

3,308,067), copolymers of acrylic acid and of maleic anhydride with a molecular mass from about 5 000 to 75 000 (EP-A-66 915);

polyethylene glycols with a molecular mass from about 1 000 to 50 000.

Fluorescers (Brighteners)

These may be present in an amount of about 0.05-1.2% by weight, these being agents such as: stilbene, pyrazoline, coumarin, fumaric acid, cinnamic acid, azole, methinecyanin, thiophene, etc. derivatives ("The production and application of fluorescent brightening agents"—M. Zahradnik, published by John Wiley & Sons, New York, 1982).

Foam Suppressants

These may be present in amounts which may be up to 5% by weight, these being agents such as:

$C_{10}$-$C_{24}$ monocarboxylic fatty acids or alkali metal, ammonium or alkanolamine salts thereof, and fatty acid triglycerides;

saturated or unsaturated aliphatic, alicyclic, aromatic or heterocyclic hydrocarbons, such as paraffins and waxes;

N-alkylaminotriazines;

monostearyl phosphates and monostearyl alcohol phosphates;

polyorganosiloxane oils or resins optionally combined with silica particles.

Softeners

These may be present in amounts of about 0.5-10% by weight, these being agents such as clays.

Enzymes

These may be present in an amount which may be up to 5 mg by weight and preferably of about 0.05-3 mg of active enzyme/g of detergent formulation, these being enzymes such as:

proteases, amylases, lipases, cellulases and peroxidases (U.S. Pat. Nos. 3,553,139, 4,101,457, 4,507,219, 4,261, 868).

Other Additives

Mention may be made, inter alia, of:

buffers, fragrances, pigments.

The detergent formulation may be used, in particular in a washing machine, in a proportion of from 0.5 g/l to 20 g/l and preferably from 2 g/l to 10 g/l to carry out washing operations at a temperature from about 25 to 90° C.

A second embodiment of the care composition of the invention consists of an aqueous liquid formulation for rinsing and/or softening articles made of textile fibers.

This formulation may be used in a proportion of from 0.2 to 10 g/l and preferably from 2 to 10 g/l.

Along with the nonionic polysaccharide, there may be present other constituents of the type such as:

combinations of cationic surfactants (triethanolamine diester quaternized with dimethyl sulfate, N-methylimidazoline tallow ester methyl sulfate, dialkyldimethylammonium chloride, alkylbenzyldimethylammonium chloride, methyl alkylimidazolinium sulfate, methyl and methylbis(alkylamidoethyl)-2-hydroxyethylammonium sulfate, etc.) in an amount which may range from 3% to 50% and preferably from 4% to 30% of said formulation, optionally combined with nonionic surfactants (ethoxylated fatty alcohols, ethoxylated alkylphenols, etc.) in an amount which may be up to 3%;

polyorganosiloxanes (0.1% to 10%)

optical brighteners (0.1% to 0.2%);

optionally, color-fast agents (polyvinylpyrrolidone, polyvinyloxazolidone, polymethacrylamide, etc. 0.03% to 25% and preferably 0.1% to 15%), colorants, fragrances, solvents, especially alcohols (methanol, ethanol, propanol, isopropanol, ethylene glycol or glycerol), foam limiters.

A third embodiment of the care composition of of the invention consists of an additive for drying articles made of textile fibers in a suitable tumble dryer.

Said additive comprises a flexible solid support consisting, for example, of a strip of woven or nonwoven textile or a sheet of cellulose, impregnated with said nonionic polysaccharide; said additive is introduced at the time of tumble-drying into the wet laundry to be dried at a temperature from about 50 to 80° C. for 10 to 60 minutes.

Said additive may also comprise cationic softeners (up to 99%) and color-fast agents (up to 80%), such as those mentioned above.

A fourth embodiment of the care composition of the invention consists of an ironing formulation which may be sprayed directly onto the dry fabrics before ironing.

Said formulation may also contain silicone-based polymers (from 0.2% to 5%), nonionic surfactants (from 0.5% to 5%) or anionic surfactants (from 0.5% to 5%), fragrances (0.1% to 3%) or cellulose derivatives (0.1% to 3%), for instance starch; spraying said formulation onto the fabrics makes it easier to iron them and limits the creasing of the fabrics when they are worn.

A fifth embodiment of the care compositon of the invention consists of a prespotter which is in the form of an aqueous solution or dispersion or a solid (stick).

Along with the nonionic polysaccharide, there may be present other constituents of the type such as:

anionic surfactants such as those already mentioned above, in an amount of at least 5% of the weight of the composition nonionic surfactants such as those already mentioned above, in an amount which may range from 15% to 40% of the weight of the composition aliphatic hydrocarbons, in an amount which can range from 5% to 20% of the weight of the composition.

The examples that follow are given for illustrative purposes.

The nonionic polysaccharides used in the examples are hydroxypropyl guar HPG1 with a degree of modification of 1.2 and a dynamic viscosity of 1 300 mPa·s hydroxypropyl guar HPG2 with a degree of modification of 0.6 and a dynamic viscosity of 3 000 mPa·s

EXAMPLE 1

Detergent Formulation

| | Formulation | | | |
|---|---|---|---|---|
| | (A) | (B) | (C) color | (D) color |
| Constituents | % by weight | % by weight | % by weight | % by weight |
| Zeolite 4A | 25 | 25 | 25 | 25 |
| $2SiO_2$, $Na_2O$ silicate | 5 | 5 | 5 | 5 |
| Sodium carbonate | 15 | 15 | 15 | 15 |
| Acrylate/maleate copolymer Sokalan CP5 (BASF) | 5 | 5 | 5 | 5 |
| Sodium sulfate | 8 | 8 | 21 | 21 |
| CMC blanose 7MXF (HERCULES) | 1 | 1 | 1 | 1 |
| Perborate monohydrate | 15 | 15 | 0 | 0 |
| Granulated TAED | 5 | 5 | 0 | 0 |
| Anionic surfactant Laurylbenzene sulfate (Nansa) | 6 | 6 | 8 | 8 |
| Nonionic surfactant Symperonic A3 (3 EO ethoxylated alcohol - ICI) | 3 | 3 | 5 | 5 |
| Nonionic surfactant Symperonic A9 (9 EO ethoxylated alcohol - ICI) | 9 | 9 | 11 | 11 |
| Enzymes (esterases, amylases, cellulase, protease) | 0.5 | 0.5 | 0.5 | 0.5 |
| Fragrances | 1 | 1 | 1 | 1 |
| Nonionic polysaccharide (% solids) | 0 | 1 | 0 | 1 |
| Polyvinyl-pyrrolidone | 0 | 0 | 1 | 1 |
| Soil-release sulfonated Copolyester REPEL-O-TEX PF 594 from Rhodia | 0.5 | 0.5 | 0.5 | 0.5 |

A washing operation is performed in a Tergotometer laboratory machine which is well known in the profession to detergent composition formulators. The machine simulates the mechanical and thermal effects of pulsating-type American washing machines, but, by virtue of the presence of 6 washing drums, it makes it possible to carry out simultaneous series of tests with an appreciable saving in time.

10×10 cm test pieces are cut from unfinished cotton (supplied under the reference 2436W by Phoenix Colio Ltd.)

The cotton test pieces are first ironed so that they all have the same level of creasing before washing.

They are then washed using the above detergent formulation containing or not containing the nonionic polysaccharide and rinsed thrice, under the following conditions:

number of test pieces per Tergotometer drum: 10
volume of water: 1 liter
water of French hardness 30° TH obtained by suitable dilution of Contrexeville® brand mineral water
washing product concentration: 5 g/l
washing temperature: 40° C.
washing time: 20 min
spin speed of the Tergotometer: 100 rpm
rinsing with cold water (about 30° TH)
rinsing time: 5 minutes The test pieces are then creased under a 150 g·cm$^{-2}$ press for 90 seconds, after which they are dried vertically overnight.

A digital color photograph is then taken of the dry test pieces, which is then converted into 256 levels of gray (gray scale from 0 to 255).

The number of pixels corresponding to each level of gray are counted.

For each histogram obtained, the standard deviation σ of the distribution of the level of gray is measured.

σ1 corresponds to the standard deviation obtained with the detergent formulation containing no nonionic polysaccharide.

σ2 corresponds to the standard deviation obtained with the detergent formulation containing the nonionic polysaccharide.

The performance value WR (Wrinkle Recovery) is given by the following equation $$WR(\%)=[(\sigma 1-\sigma 2)/\sigma 1]f\times 100$$

f being a normalization factor, which is about 2.1 here.

A value of:

0% corresponds to zero benefit

100% corresponds to an uncreased surface (flat surface obtained after ironing).

The performance values obtained are as follows:

| | Formulation | | | | | |
|---|---|---|---|---|---|---|
| | | (B) | | | (D) | |
| | (A) | HPG1 | HPG2 | (C) | HPG1 | HPG2 |
| WR | 0% | 20% | 18% | 0% | 29% | 22% |

These positive values of WR are representative of a crease-resistance property provided by the detergent formulation comprising the nonionic polysaccharide according to the invention.

EXAMPLE 2

Rinsing/Softening Formulation

| Constituents | % by weight |
|---|---|
| Cationic surfactant: ditallow dimethylammonium chloride | 5% |
| Fragrance | 1% |
| HCl to obtain a pH = 3 | 0.2% |
| Nonionic polysaccharide (% solids) | 2% |

EXAMPLE 3

Measurement of the Protection of Colors

Principle

This consists in performing, under defined conditions, 10 washes of a sample of several colored cotton fabrics. The color protection efficacy is tested in an automatic washing machine. The actual assessment is performed by a reflectance measurement. The fabrics are examined before and after 10 washes. The variation in color thus recorded (ΔE*) constitutes the loss of color on each type of fabric.

Apparatus—Reagents

AEG Lavamat 2050 Turbo automatic washing machine: Commercial front-loading washing machine—wash cycles at 40° C.—volume of washing water: 13 liters Recorded program: 10 wash cycles LUCI100—Dr Lange reflectometer:

This is a reflectance machine used for measuring the colors of fabrics before and after washing.

6 tea towels: made of gray cotton cloth referenced 402MBLI (from D. PORTHAULT SA)

4 towels (as ballast): plush-loop white cotton terry towel 500 g/m$^2$ (from D. PORTHAULT SA)

Sampling of 3 different commercial colored fabrics black woven cotton red woven cotton turquoise woven cotton blue woven cotton printed woven cotton Procedure Washing Conditions:

| | |
|---|---|
| Wash temperature: | 40° C. |
| Duration: | about 67 min |
| Number of washes: | 10 |
| Laundry load: | 3 kg dry weight<br>(4 towels + 6 tea cloths + colored fabrics) |
| Bath volume: | 13 liters ± 1 liter |
| Water hardness: | about 23° TH French |
| Washing formula concentration: | 5 ± 0.1 g/l |

Procedure: 5 steps

Measuring the color of the new fabric samples

Sewing of the colored fabric samples to the tea cloths in order to avoid fraying during the successive washes Performing the 10 washes without drying between the cycles Drying in open air Measuring the colors on the washed fabrics The colors are measured on a LUCI100 reflectometer:

The measuring system used is the CIE [International Commission on Illumination]—L* a* b* system (DIN6174, CIELAB 1976).

It is made up as follows:

L* corresponds to the degree of whiteness on a white-black scale.

L*=100 for a white sample

L*=0 for a black sample a* positions the color in a range from green to red.

a*≧0 the color tends toward red.

a*≦0 the color tends toward green.

b* positions the color in a range from yellow to blue.

b*≧0 the color tends toward yellow.

b*≦0 the color tends toward blue.

Each sample of fabric is measured at 5 different points (one at the center and one in each corner) and the average of the components L*, a* and b* is calculated.

Exploiting the Results

The reflectometer is equipped with software that indirectly calculates the ΔE* from the data recorded above. This value corresponds to the color variation recorded on the fabric after washing and is expressed as follows:

$\Delta L^* = L^*_{after\ washing} - L^*_{before\ washing}$ $\Delta a^* = a^*_{after\ washing} - a^*_{before\ washing}$ $\Delta b^* = b^*_{after\ washing} - b^*_{before\ washing}$ The loss of color for each fabric is then given by the following expression:

$$\Delta E^* = \sqrt{(\Delta L^*)^2 + (\Delta a^*)^2 + (\Delta b^*)^2}$$

The performance quality of the polysaccharide is evaluated as a percentage, according to the following equation $$\%\ \text{performance} = \left(\frac{\Delta E_{ref} - \Delta E_{treated}}{\Delta E_{ref}}\right) \times 100\%$$

$\Delta E_{ref}$ corresponding to the ΔE obtained with formulation (C) of Example 1 without nonionic polysaccharide $\Delta E_{treated}$ corresponding to the ΔE obtained with formulation (D) of Example 1 containing a nonionic polysaccharide.

A performance of

0% corresponds to zero benefit relative to the fabric washed without nonionic polysaccharide 100% corresponds to an absence of color change (the fabric is like new).

The results obtained are as follows:

| | | (D) | |
|---|---|---|---|
| Fabric | (C) | HPG1 | HPG2 |
| Black | 0% | 16% | 24% |
| Red | 0% | 31% | 12% |
| Turquoise | 0% | 18% | 47% |
| Blue | 0% | 12% | 14% |
| Printed | 0% | 8% | 15% |

These results show that the presence of nonionic polysaccharide in the formulation (D) allows the protection of the colors to be considerably improved.

The invention claimed is:

1. A process for improving the properties of a composition for caring for articles made of textile fibers in aqueous or wet medium, comprising the step of adding to said composition at least one nonionic polysaccharide, for preventing the degradation of said articles and in an amount for protecting the colors of said articles and/or for affording said articles crease-resistance and/or softening properties, wherein said polysaccharide is soluble under the working conditions of said composition, and has a native skeleton consisting essentially of:

a main chain comprising similar or different anhydrohexose units, and branches comprising at least one anhydropentose and/or anhydrohexose unit, wherein the anhydrohexose and/or anhydropentose units of the native skeleton are modified with at least one nonionic group, further wherein said polysaccharide has a degree of modification MS of the anhydrohexose and/or anhydropentose units with said nonionic group or groups of at least 0.001.

2. The process as claimed in claim 1, wherein the degree of modification MS is up to 6.

3. The process as claimed in claim 2, wherein the degree of modification MS is less than 3.

4. The process as claimed in claim 3, wherein the degree of modification MS is up to 2.

5. The process as claimed in claim 1, wherein the nonionic groups are linked to the carbon atoms of the sugar skeleton either directly or via —O— bonds.

6. The process as claimed in claim 1, wherein the nonionic groups have the formula:

$-[-CH_2-CH(R)-O]_x-R^1$ in which:

R is a hydrogen atom or an alkyl radical containing from 1 to 4 carbon atoms, x is an integer ranging from 0 to 6, $R^1$ represents:

a hydrogen atom when x is different from 0, an alkyl radical containing from 1 to 22 carbon atoms, optionally interrupted with one or more oxygen and/or nitrogen hetero atoms, cycloalkyl, aryl or arylalkyl, containing from 6 to 12 carbon atoms, a radical $-(CH_2)_y-COOR^2$, a radical $-(CH_2)_y-CN$, a radical $-(CH_2)_y-CONHR^2$, $R^2$ representing an alkyl, aryl or arylalkyl radical containing from 1 to 22 carbon atoms, and y is an integer ranging from 0 to 5; or $-CO-NH-R^1$ linked to a carbon atom of the sugar skeleton via an —O— bond, $R^1$ having the definition given above.

7. The process as claimed in claim 1, wherein said nonionic groups are methyl, ethyl, propyl, isopropyl, butyl, hexyl, octyl, dodecyl, octadecyl, phenyl, benzyl, linked to a carbon atom of the sugar skeleton via an ether, ester, amide or urethane bond, cyanoethyl, hydroxyethyl, hydroxypropyl, or hydroxybutyl, linked to a carbon atom of the sugar skeleton via an —O— bond.

8. The process as claimed in claim 1, wherein the hexose units, being identical or different, of the main chain of the native skeleton are D-glucose, D-galactose, L-galactose, D-mannose, D-fucose, L-fucose, or L-rhamnose units.

9. The process as claimed in claim 1, wherein the pentose and/or hexose units (identical or different) of the branches of the native skeleton are D-xylose, L-arabinose, D-arabinose, D-glucose, D-galactose, L-galactose, D-mannose, D-fucose, L-fucose, or L-rhamnose units.

10. The process as claimed in claim 1, wherein said native skeleton is a galactomannan, galactoglucomannan, xyloglucan or scleroglucan.

11. The process as claimed in claim 10, wherein said native skeleton is a galactomannan.

12. The process as claimed in claim 11, wherein said nonionic polysaccharide is a hydroxypropyl galactomannan.

13. The process as claimed in claim 12, wherein said nonionic polysaccharide is a hydroxypropyl guar.

14. The process as claimed in claim 13, wherein said hydroxypropyl guar has a degree of modification from 0.1 to 6.

15. The process as claimed in claim 14, wherein said degree of modification is from 0.4 to 1.2.

16. The process as claimed in claim 13, wherein said composition is the form:

of a solid, of a dispersion or of a concentrated aqueous solution placed in contact with the articles made of textile fibers to be treated, after dilution in water;

of a dispersion or of a concentrated aqueous solution placed beforehand on the dry articles made of textile fibers to be treated before dilution in water;

of a dispersion or of an aqueous solution to be placed directly on the dry articles made of textile fibers to be treated without dilution or of a solid support comprising said nonionic polysaccharide, to be applied directly to the dry articles to be treated; or of an insoluble solid support comprising said nonionic polysaccharide placed directly in contact with the wet articles made of textile fibers to be treated.

17. The process as claimed in claim 1, wherein said composition comprises from 0.05% to 10% of said nonionic polysaccharide expressed as solids.

18. The process as claimed in claim 1, wherein said composition is a solid or liquid detergent formulation comprising from 0.05% to 5%, expressed as solids, capable of directly forming a washing bath by dilution;

a liquid rinsing and/or softening formulation comprising from 0.05% to 3%, of said nonionic polysaccharide, expressed as solids, capable of directly forming a rinsing and/or softening bath by dilution;

a solid material, especially a textile material, comprising from 0.05% to 10%, of said nonionic polysaccharide, expressed as solids, which is intended to be placed in contact with wet articles made of textile fibers in a tumble dryer;

an aqueous ironing formulation comprising from 0.05% to 10%, of said nonionic polysaccharide, expressed as solids; or a prespotter comprising from 0.05% to 10%, of said nonionic polysaccharide, expressed as solids, which is intended to be applied to the dry articles made of textile fibers prior to a washing operation using a detergent formulation containing or not containing said nonionic polysaccharide.

19. The process as claimed in claim 1, wherein said composition contains at least one surfactant and/or one detergent additive and/or rinsing additive and/or softener for articles made of textile fibres and/or one solid support for said nonionic polysaccharide.

20. A process for preventing the degradation of articles made of textile fibers and for protecting the colors of said articles and/or for affording said articles crease-resistance and/or softening properties, by treating said articles, in aqueous or wet medium, using a composition comprising at least one nonionic polysaccharide, soluble under the working conditions of said composition, and having a native skeleton consisting essentially of:

a main chain comprising similar or different anhydrohexose units, and branches comprising at least one anhydropentose and/or anhydrohexose unit, wherein the anhydrohexose and/or anhydropentose units of the native skeleton are modified with at least one nonionic group, further wherein said polysaccharide has a degree of modification MS of the anhydrohexose and/or anhydropentose units with said nonionic group or groups of at least 0.001.

21. The process as claimed in claim 20, wherein said composition is a solid or liquid detergent formulation comprising from 0.05% to 5%, expressed as solids, capable of directly forming a washing bath by dilution;

a liquid rinsing and/or softening formulation comprising from 0.05% to 3%, of said nonionic polysaccharide, expressed as solids, capable of directly forming a rinsing and/or softening bath by dilution;

a solid material, especially a textile material, comprising from 0.05% to 10%, of said nonionic polysaccharide, expressed as solids, which is intended to be placed in contact with wet articles made of textile fibers in a tumble dryer;

an aqueous ironing formulation comprising from 0.05% to 10%, of said nonionic polysaccharide, expressed as solids; or a prespotter comprising from 0.05% to 10%, of said nonionic polysaccharide, expressed as solids, which is intended to be applied to the dry articles made of textile fibers prior to a washing operation using a detergent formulation containing or not containing said nonionic polysaccharide.

22. The process as claimed in claim 20, wherein said composition contains at least one surfactant and/or one detergent additive and/or rinsing additive and/or softener for articles made of textile fibres and/or one solid support for said nonionic polysaccharide.

23. The method of claim 1, wherein the degree of modification MS of the anhydrohexose and/or anhydropentose units with said nonionic group or groups is at least 0.01.

24. The method of claim 20, wherein the degree of modification MS of the anhydrohexose and/or anhydropentose units with said nonionic group or groups is at least 0.01.

25. A process for improving the properties of a composition for caring for articles made of textile fibers in aqueous or wet medium, comprising the step of adding to said composition at least one nonionic polysaccharide, for preventing the degradation of said articles and in an amount for protecting the colors of said articles and/or for affording said articles crease-resistance and/or softening properties, wherein said polysaccharide is soluble under the working conditions of said composition, and has a native skeleton consisting of:

a main chain comprising similar or different anhydrohexose units, and branches comprising at least one anhydropentose and/or anhydrohexose unit, wherein the anhydrohexose and/or anhydropentose units of the native skeleton are modified with at least one nonionic group, further wherein said polysaccharide has a degree of modification MS of the anhydrohexose and/or anhydropentose units with said nonionic group or groups of at least 0.01.

* * * * *